Feb. 28, 1961 W. H. NEBGEN 2,972,818
SELF-SEALING ROTARY KILN
Filed Feb. 11, 1960
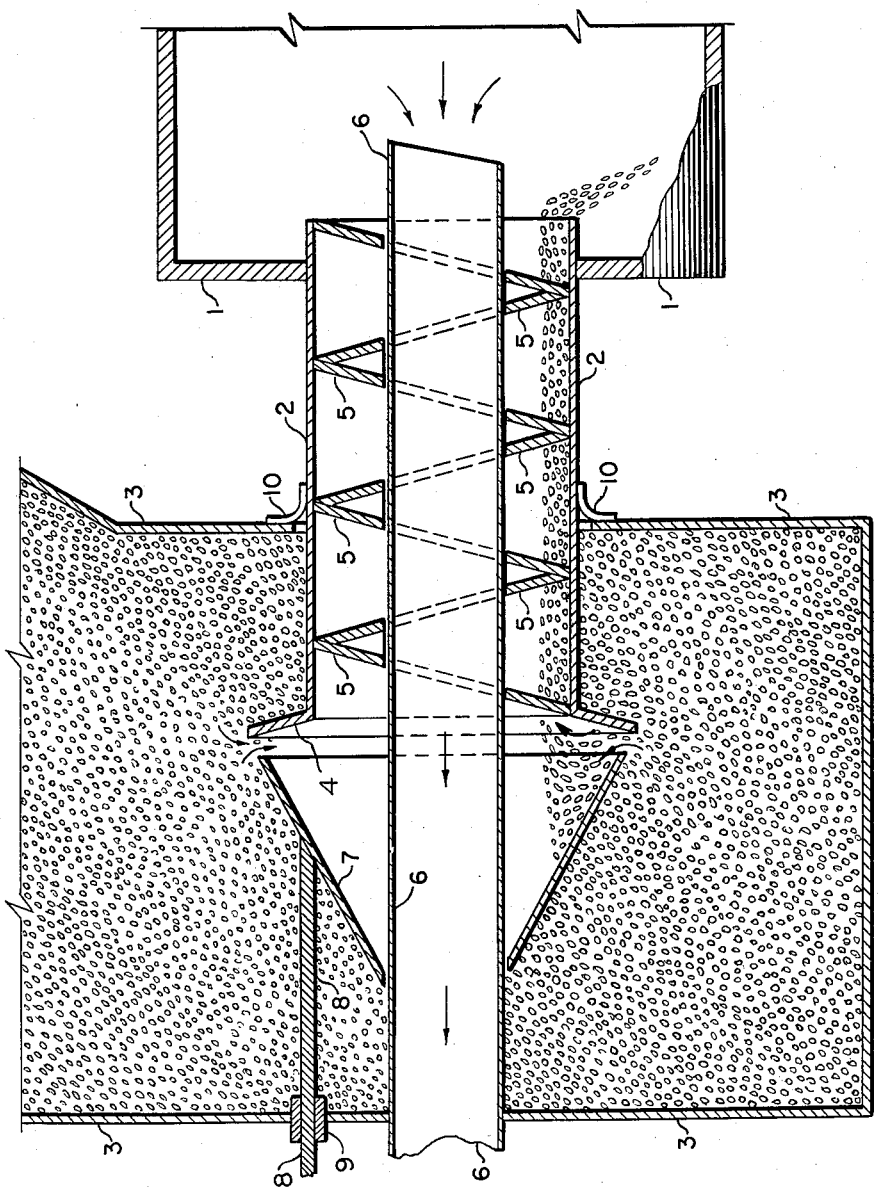
WILLIAM H. NEBGEN
INVENTOR.
BY J. Z. Chaboty
AGENT

United States Patent Office 2,972,818
Patented Feb. 28, 1961

2,972,818
SELF-SEALING ROTARY KILN

William H. Nebgen, Woodside, N.Y., assignor to Chemical Construction Corporation, New York, N.Y., a corporation of Delaware Filed Feb. 11, 1960, Ser. No. 8,130

8 Claims. (Cl. 34—137)

This invention relates to rotary reaction vessels, particularly kilns, in which a solid material is fed into the vessel and a gaseous product is withdrawn. An apparatus is provided for the simultaneous admittance of solid feed and withdrawal of gaseous product, in which the solid feed acts as a seal to prevent escape of gaseous product.

Various industrial processes involve the treatment or reaction of a solid feed in a rotating vessel and simultaneous withdrawal of a gaseous product or byproduct. Among these may be mentioned the various types of rotary kilns which are employed in different industries for high temperature thermal processing or drying of solids. In numerous instances the complete recovery of a gaseous component from the system is economically desirable, particularly when this component is the desired product of the process. In some cases complete recovery is essential for various reasons, such as when the gaeous component is poisonous or acts to pollute the atmosphere.

Typical of such situations is the production of hydrofluoric acid. This compound is produced by reacting kiln calcium fluoride with sulfuric acid in a reaction kiln which is rotated and externally heated to insure complete reaction. The hydrofluoric acid is generated and withdrawn as hydrogen fluoride gas. This compound is very poisonous and highly corrosive, and consequently the rotating reaction vessel must be thoroughly sealed against the atmosphere to prevent leakage. Usually the vessel is maintained at a pressure slightly below atmospheric, so that any leakage will result in a flow of air into the vessel rather than an outward flow of hydrogen fluoride. However, the effective sealing of the vessel is a serious problem, since process upsets may occur resulting in the generation of a positive pressure within the vessel. In addition, the inward flow of air reduces overall process efficiency.

Numerous types of mechanical or lubricated seals have been suggested or employed in various installations, however, these sealing means are open to various objections. Displacement of the apparatus due to wear or corrosive effect of the reaction product may cause a misfit of mechanical seals, while lubricated seals are also troublesome due to inevitable incorporation of solid material into the sealant.

In the present invention an apparatus arrangement is provided in which the solid feed itself acts as a sealant, permitting the simultaneous controlled feeding of input solids and separate withdrawal of gaseous product. A conduit is attached to and rotates with the reaction kiln. This conduit extends into the stationary container holding the solid feed, and is provided with internal spiral flighting which is attached to the inner surface of the conduit but extends only part way to the center of the conduit, leaving a central void in the conduit. This flighting moves solid feed into the kiln, while gaseous product is withdrawn through a central stationary duct which is extended through the central void in the conduit and then through the solids container. Sealing is effected by regulating the flow of solids into the flighting by means of a baffle which is extended in close proximity to the end of the conduit and prevents the flighting from filling with solid feed. Thus the solids feed rate may be regulated by adjusting the baffle, while gas flow cannot extend beyond the baffle due to the fact that this section of the apparatus is completely enclosed within the main body of solids feed and thus the gas canont penetrate through the mass of solid material which acts as a plug. Since the solids feed rate is regulated by the amount of opening between the essentially stationary baffle and the rotating conduit, very accurate control of solids feed rate is achieved since bridging or other solids flow problems are completely eliminated.

It is an object of this invention to provide a self-sealing apparatus for introducing solid material into a rotating reaction kiln and removing gaseous reaction product.

Another object is to provide an appaartus which permits simultaneous feed of solid material to a rotating kiln and withdrawal of gaseous product without leakage or loss of gaseous product.

A further object is to provide apparatus for accurately controlled and adjustable feeding of solid material into a rotating kiln with simultaneous removal of gaseous product.

Still another object is to provide a gas-tight apparatus for controlled feed of fluorspar into a rotating kiln for reaction with sulfuric acid, and simultaneous recovery of hydrogen fluoride gas, wherein gas leakage is prevented.

An additional object is to provide an apparatus which employs solid feed material being fed into a rotating kiln as a sealant to prevent gas leakage and allow withdrawal of gaseous product.

These and other objects of this invention will become evident from the description which follows.

Referring to the figure, which illustrates a preferred embodiment of the present invention, section 1 is a portion of the wall of a rotary reactor or kiln. Conduit 2 is attached to section 1 and extends from inside the rotary vessel into the separate stationary container 3 which holds the solid feed material. In this case the vessel 1 and attached conduit 2 rotate about an essentially horizontal axis, however, it should be understood that the apparatus may be disposed and rotated about an axis which is somewhat inclined relative to the horizontal, in order to facilitate movement of solid material within the kiln itself.

The conduit 2 terminates within container 3, and flange 4 is preferably provided at the end of container 3, inclined from the vertical in a direction away from kiln 1. Conduit 2 is also provided with internal spiral flighting 5, which is attached to the inner surface of the conduit and extends inwards to an inner perimeter, thus providing a central void space in the center of conduit 2. Stationary gas duct 6 extends through this central void space and also through the solids container 3, and serves to condut the gas stream generated within vessel 1 to external utilization.

Baffle 7 is disposed within solids container 3 and juxtaposed relative to flange 4 of conduit 2, so as to control the flow of solid material into the feed space defined by baffle 7, flange 4 and the outer surface of duct 6. Baffle 7 is supported within container 3 by support means such as rod 8. In this preferred embodiment rod 8 extends external to container 3, passing through stuffing box 9 or other suitable solids sealing means. This arrangement permits the position of baffle 7 to be varied relative to rotating flange 4. Solids sealing means such as flexible seal 10 is provided to prevent solids leakage in the opening between the outside of rotating conduit 2 and the wall of container 3.

In operation, solids flow takes place through the restricted opening between baffle 7 and rotating flange 4, Since there is a constant relative motion between the essentially stationary baffle 7 and flange 4, the solids flow is uniform and practically constant. Thus fluctuations due to bridging and other solids flow phenomena are avoided. The solid feed flows into the space defined by baffle 7, flange 4 and the outside of duct 6. This space is filled with product gas, however, since solid material completely surrounds this space the escape or leakage of gas out of the apparatus is prevented. The solid feed is now picked up and removed from this space by rotating flighting 5, which moves the solid material horizontally into vessel 1 by the well-known screw conveyor type of motion. The gas product produced within vessel 1 passes out of the apparatus through stationary duct 6. It should be noted that duct 6 may be utilized for other purposes in addition to gas removal. Thus an additional reaction component may be introduced into vessel 1 by means of a stationary pipe passing into vessel 1 within duct 6. In the case of hydrofluoric acid manufacture, the liquid sulfuric acid feed is preferably introduced in this manner.

The baffle 7 and flange 4 are preferably disposed as shown in the figure, so as to provide an expanding solids flow passage from the narrow opening between the sections which serves to restrict solids flow. Thus free flow of solids without blockage or accumulation is insured. Other suitable configurations of baffle 7 relative to flange 4 will occur to those skilled in the art. In some cases flange 4 may be eliminated and baffle 7 disposed in juxtaposition with the circular end of conduit 2 as such. It should be noted that in this preferred embodiment baffle 7 is cone-shaped and extends in close proximity to duct 6, so as to avoid any significant solids flow between this end of 7 and the outside surface of duct 6. Other suitable configurations will occur to those skilled in the art.

Finally, it should be understood that the apparatus of the present invention is limited to those cases in which it is possible for the solid material to act as a seal against gas flow. Usually the apparatus will be effective where the solid feed is a powdered or finely ground granular material, however, where the solid is coarse-grained with effective inter-granular void spaces, utilization of the present apparatus to effect gas sealing may not be possible since in this case the gas could permeate through the entire body of solid material in container 3 and thus escape from the apparatus. The possible application of the present invention to a specific installation is readily determined by a simple laboratory test, in which the depth of solid material required for zero gas flow is determined for the particular gas pressure differential to be encountered in the specific installation.

An example of the application of the present invention to hydrofluoric acid manufacture will now be described.

Tests of ground fluorspar were made, to determine effectiveness of this material as a seal against gas flow. The fluorspar was ground to the standard fineness of size distribution specified for hydrogen fluoride production, and the amount of gas flow through a one foot thick bed was measured for various gas pressure differentials across the bed. The following results were obtained.

| Gas Pressure Differential (inches of water) | Gas Leakage Flow (cubic feet of gas per hour per square foot of bed) |
| --- | --- |
| 2 | 0 |
| 5 | 3.5 |
| 10 | 7.0 |

Based on the above data, a commercial installation producing 1200 pounds/hour of hydrogen fluoride in a kiln rotating at 3 r.p.m. was operated using the apparatus of the present invention. The hydrogen fluoride gas outlet pipe was 10 inches in diameter, and the external revolving conduit with spiral flighting was 20 inches in diameter. The kiln was operated at about 2 inches of water negative pressure, and the fluorspar feed rate was about 2400 pounds per hour. A minimum depth of 24 inches of ground fluorspar was maintained above the top of the rotating flange attached to the revolving conduit. Under these conditions there was no detectable air in-leakage. When the unit was shut down and checked out, there was no escape of hydrogen fluoride gas into the surrounding atmosphere.

I claim:

1. Rotary kiln with means for gas tight self-sealing solids entry combined with gas removal comprising a reaction kiln, a solids feed conduit attached to and coaxially extending from an axially-located opening in said kiln whereby rotation of said kiln effects circular rotation of said conduit, helicoid spiral flighting disposed within said conduit and attached to said conduit, said flighting terminating at an inner perimeter whereby a central axial void space is provided within said conduit, a stationary solids container having an opening through which said conduit extends into said solids container, a stationary gas outlet duct extending through said solids container and through said conduit within the inner perimeter of said flighting and into said kiln, a solids retention baffle within said solids container juxtaposed relative to the end of said conduit whereby passage of solids from said solids container into said flighting is substantially controlled, support means for said baffle within said solids container, and solids sealing means extending between the opening in said solids container and said conduit.

2. Apparatus of claim 1, in which said support means consists of a rod, said rod extending out of said solids container, whereby the position of said baffle relative to said conduit end is externally adjustable by motion of said rod.

3. Apparatus of claim 1, in which the end of said conduit is provided with an extension comprising a flange, said flange being in juxtaposition with said baffle.

4. Apparatus of claim 1, in which said baffle extends toward said duct and terminates in juxtaposition with the outer surface of said duct.

5. Apparatus of claim 4, in which said baffle is shaped essentially conically and wherein the support means comprises at least one support rod.

6. Aparatus of claim 5, in which said rod is movable and extends external to said solids container through solids sealing means, whereby the position of said baffle relative to said conduit end is adjustable.

7. Apparatus of claim 3, in which said flange inclines from the vertical and is thereby essentially conically shaped and wherein the outer perimeter of said flange is displaced horizontally away from the end of said conduit.

8. Apparatus of claim 7, in which said baffle is inclined relative to said flange whereby only the end of said baffle is in juxtaposition with the outer perimeter of said flange and the balance of said baffle extends away from said flange.

References Cited in the file of this patent

UNITED STATES PATENTS

| | | |
| --- | --- | --- |
| 730,782 | Morrison | June 9, 1903 |
| 1,350,627 | Broeek et al. | Aug. 24, 1920 |
| 1,781,712 | Wallace | Nov. 18, 1930 |
| 2,021,991 | Depew | Nov. 26, 1935 |
| 2,932,557 | List | Apr. 12, 1960 |